Oct. 4, 1927.

F. HYMANS

POWER TRANSMISSION

Filed Oct. 14, 1922

1,644,337

INVENTOR
Frederick Hymans
BY
ATTORNEY

Patented Oct. 4, 1927.

1,644,337

UNITED STATES PATENT OFFICE.

FREDERICK HYMANS, OF PHILADELPHIA, PENNSYLVANIA.

POWER TRANSMISSION.

Application filed October 14, 1922. Serial No. 594,450.

My invention broadly relates to means, in association with transmission of power from a prime mover to a driven object, whereby objectionable periodic torsional vibrations are eliminated in the transmission system.

More specifically, my invention has special application to driving means between a slow running explosive engine of large power and a fast driven or high speed machine, such as a dynamo electric generator, wherein the speed of the driven machine is greatly increased over that of the engine. Engines of the Diesel type and large power are necessarily run at slow speeds and if directly connected to an electric generator, the latter must be of large diameter and size and hence objectionable to such an extent as to be commercially prohibitive. It, therefore, has been necessary to employ speed increasing gearing between the engine and generator so that the latter may be driven at the high speed necessary to insure predetermined output of energy. Such geared transmission has heretofore been objectionable for the following reasons: Primarily, the gearing to be successful, must be free from variations due to torsional fluctuations caused by variations in rotational velocity of the engine. As is well known, a Diesel engine is subject to very large periodic variations of torque and by reason of which, torsional vibrations become manifest at the gears, a defect which is not removable even where very large flywheels are employed in close couple with the engine and gears.

The object of my invention, therefore, is to provide means which will substantially eliminate objectionable torsional vibrations at the gears, thereby removing the objections heretofore existing to the use of a geared drive between the Diesel or equivalent engine and electric generator or other driven machine.

With the above and other objects in view, the nature of which will be more fully understood from the description hereinafter, the invention consists in the novel construction of power transmission, as hereinafter more fully described and defined in the claims.

Figure 1:
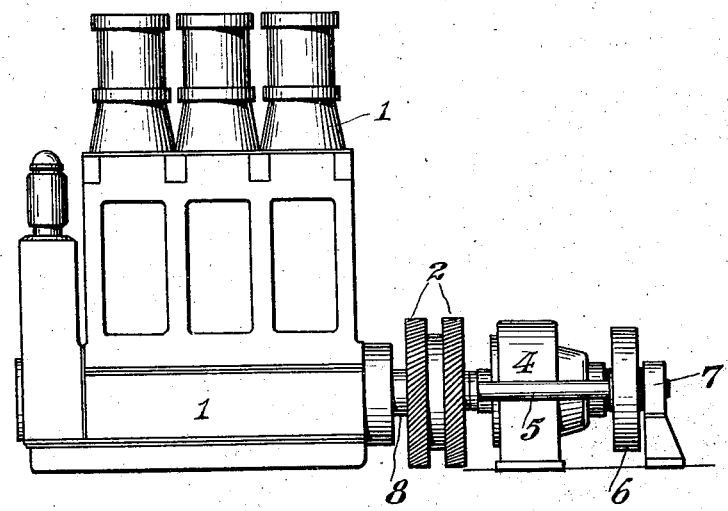
Figure 2:
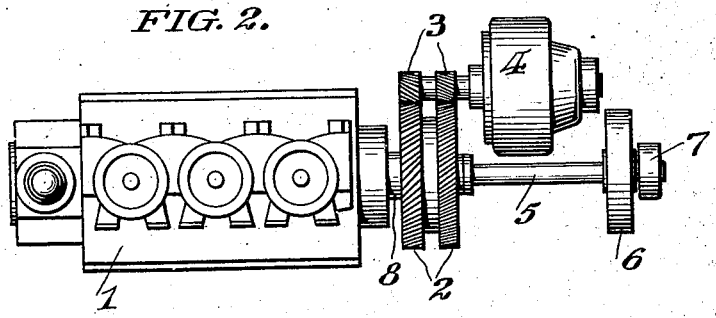
Figure 3:
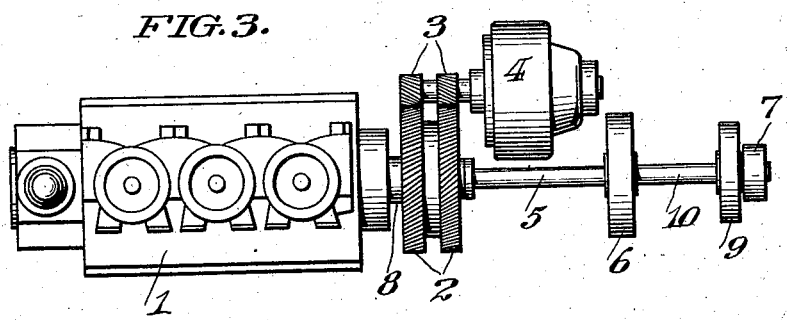

Referring to the drawing: Fig. 1 is an elevation of a geared transmission between a Diesel engine and generator and embodying my improvements; Fig. 2 is a plan view of the same; and Fig. 3 is a similar plan view showing a modification of my invention adapted to cases where the engine is to have capacity to be driven at a plurality of speeds.

In the several figures of the drawing, 1 is the Diesel engine, 4 is the electric generator or driving machine, 2 and 3 are the speed increasing gearing between the Diesel engine shaft and shaft of the generator, and 8 is the bearing of the engine shaft next to the gears 2. To these elements I provide additional means, to be described, whereby all objectionable periodic torsional fluctuations in the speed of the gears 2 is annulled or counteracted.

Assuming for example, that the engine has three cylinders, a study of the crank effort diagram will show that said effort substantially consists of a constant torque on which a third harmonic vibration is superposed. The frequency of the periodic torque, due to the presence of this third harmonic, is proportional to the revolutions constant within the limits of a few per cent by a suitable governor. Should there exist within the engine only a single periodic torque of a definite frequency, which tends to cause fluctuations in the velocity of the gears 2, these fluctuations may be counteracted and substantially eliminated by novel means, comprising a shaft extension 5 in axial alinement with the engine shaft, having secured thereon a fly-wheel 6 at a distance from the gears, and said shaft supported by a suitable bearing 7. The shaft 5 is in effect a torsional spring whose elasticity can be predetermined and established by the proper selection of its quality, diameter and length. It will be understood that the flywheel being an inert mass, the shaft and flywheel together comprise an elastic system with capacity to respond to torsional vibrations of a definite frequency, and by the proper design they may be given the same frequency as that of the impressed periodic torque arising from the presence of the third harmonic vibration due to the variations in rotational velocity of the engine.

If the system, last described, is attached to the gears 2 in the manner shown in Figs. 1 and 2, so that the shaft 5 rotates in synchronism with the engine shaft, it will be in resonance with the harmonic torque aforesaid; and can be shown mathematically and experimentally that the fly-wheel 6 will itself vibrate in such a phase and with such amplitude as to wholly oppose and destroy the effect of the periodic torque on the gears 2, said gears then rotating at a perfectly uniform speed, notwithstanding the presence of a periodic torque in the engine. This being accomplished, the gears 2 may be meshed with pinions 3 to uniformly drive a generator or other machine 4 at any predetermined speed without objectionable vibration.

It is sometimes desirable, in marine installations, for example, to run the engine at two definite speeds. In that case, the frequency of the periodic torque at one speed will be of one degree or extent and at the other speed another or different degree or extent. To counteract torsional fluctuations in the speed of gears 2, it will be necessary to attach thereto an elastic system of the character set out, but having two periods of free vibration with frequencies the same as the frequencies of the impressed periodic torque due to the two speeds of the engine. This is obtained by making the counteracting system one of two degrees of freedom; and an example of such a system is shown in Fig. 3, which employs two elastic shafts 5 and 10, respectively, provided with flywheels 6 and 9. Where compensation is required for more than two variations in speed, the system may be extended to provide three or more degrees of freedom, as may be necessary.

The arrangement, just described, is also useful when the torque delivered by the cylinders contains a plurality of harmonics of different frequencies. Strictly speaking, this is always the case although by proper design, it can be obtained that only one of them is of sufficient magnitude and direction to become manifest in vibrations. Nevertheless, in some cases, it occurs that next to the harmonic just mentioned there are others of different frequencies whose magnitudes are sufficient to make it desirable to nullify their tendency to produce such vibrations. In those cases, it is also necessary to make the compensating system of as many degrees of freedom with as many frequencies as there are vibrations, due to harmonics, to counteract.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:

1. The herein described power transmission drive, comprising a prime mover and its shaft, a machine to be driven, and transmission gearing between the shaft of the prime mover and the driven machine, combined with rotating means for counter-acting periodic vibrations of torque at the gearing, said means coupled to and in synchronous relation to the prime mover and gearing, wherein the prime mover is arranged for running under a plurality of predetermined speeds and produces a corresponding periodic variation of torque which is transmitted to the gearing, and wherein further the means for counteracting it has a corresponding plurality of periods of free vibration with frequencies corresponding to the frequencies of impressed periodic torque due to the prime mover under its changes in speed, whereby the periodic torsional vibrations of the gearing under the changes in speed are automatically counteracted.

2. The invention according to claim 1, wherein the means for counteracting the periodic torsional vibrations in the gearing comprises a torsional spring shaft structure arranged to rotate synchronously with the shaft of the prime mover and the gearing driven thereby, and a plurality of fly-wheels secured to the shaft structure at spaced distances along its length.

3. The herein described power transmission drive, comprising a prime mover and its shaft, a machine to be driven, and transmission gearing between the shaft of the prime mover and the driven machine, which prime mover in operation produces variations of torque of a plurality of frequencies which are transmitted to the transmission gearing and tending to produce therein corresponding vibrations, combined with rotating means for counteracting the plurality of periodic vibrations due to the prime mover, said means rotating in synchronism with the prime mover and arranged to counteract the tendency to periodic vibrations in the transmission gearing and having a plurality of periods of free torsional vibration with frequencies substantially the same as the frequencies of the impressed torque of the prime mover.

In testimony of which invention, I hereunto set my hand.

FREDERICK HYMANS.